United States Patent
Scheibel et al.

[15] 3,672,268
[45] June 27, 1972

[54] PHOTOGRAPHIC APPARATUS FOR USE IN DAYLIGHT AND ARTIFICIAL LIGHT

[72] Inventors: Josef Scheibel, Over-Morlen; Karl-Heinz Schadt, Schwalbach, both of Germany

[73] Assignee: Niezoldi & Kramer GmbH, Munich Germany

[22] Filed: May 15, 1969

[21] Appl. No.: 824,880

[30] Foreign Application Priority Data

May 16, 1968 Germany...................P 17 72 445.7

[52] U.S. Cl. ..........................95/10 CE, 95/11 R, 352/78 C
[51] Int. Cl. ......................................................G01j 1/22
[58] Field of Search..................95/10 C, 11; 352/72, 141, 78

[56] References Cited

UNITED STATES PATENTS

| | | | |
|---|---|---|---|
| 3,472,137 | 10/1969 | Galbraith | 95/10 C |
| 3,176,599 | 4/1965 | Anwyl | 95/10 |
| 3,314,344 | 4/1967 | Anwyl et al. | 95/10 |
| 3,452,658 | 7/1969 | Krull et al. | 95/11 |
| 3,500,730 | 3/1970 | Matsubara et al. | 95/10 |

*Primary Examiner*—Samuel S. Matthews
*Assistant Examiner*—Fred L. Braun
*Attorney*—Michael S. Striker

[57] ABSTRACT

A camera wherein one or more corrective filters are moved into or from the path of incoming scene light when the spectral composition of such light matches or does not match the spectral sensitivity of film which is used in the camera. The filter or filters can be displaced by an electric circuit having one or more photosensitive resistors which can change the condition of a relay, electromagnet or transistor whereby the latter energizes one or more electromagnets which are directly or indirectly connected with the filter or filters.

4 Claims, 8 Drawing Figures

INVENTORS
JOSEF SCHEIBEL
KARL-HEINZ SCHADT
BY
ATTORNEY

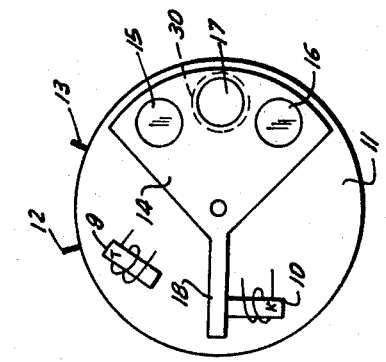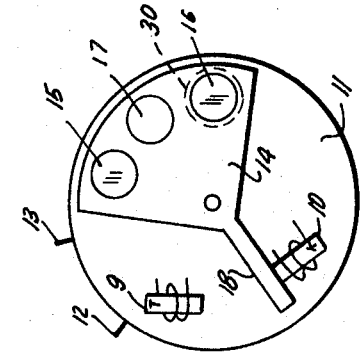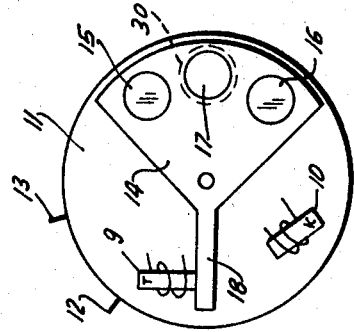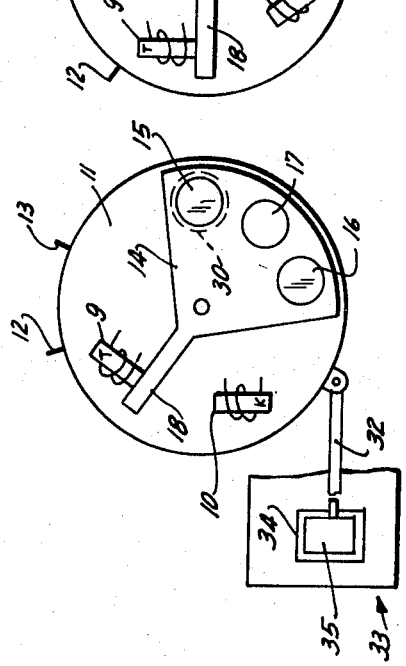

PHOTOGRAPHIC APPARATUS FOR USE IN DAYLIGHT AND ARTIFICIAL LIGHT

CROSS-REFERENCE TO RELATED APPLICATION

This application relates to improvements in photographic apparatus disclosed in the copending application Ser. No. 568,653 of Krull et al., now U.S. Pat. No. 3,452,658, which is assigned to the same assignee and to which reference may be had if necessary.

BACKGROUND OF THE INVENTION

The present invention relates to photographic apparatus in general, and more particularly to improvements in cameras which employ corrective filters. Such filters enable a camera to make satisfactory exposures with daylight film in artificial light or daylight and/or to make satisfactory exposures with artificial light film in daylight or artificial light.

The U.S. Pat. No. 3,452,658 discloses a camera wherein the means for moving filters to and from registry with the optical axis comprises a light meter which is in circuit with two photosensitive resistors one of which reacts to daylight and the other to which reacts to artificial light. The output member of the meter assumes a position which is a function of the resistance of photosensitive elements and is further a function of spectral sensitivity of inserted film. Such position of the output member is detected by a scanning device which serves as a means for affecting movement of an appropriate corrective filter into or away from registry with the objective lens. The mechanism which couples the filters with the output member of the light meter is rather complicated and bulky.

SUMMARY OF THE INVENTION

An object of my invention is to provide a novel and improved camera wherein one or more built-in corrective filters can be moved into and away from the path of incoming scene light in a novel and improved way.

Another object of the invention is to provide the camera with novel filter displacing means.

A further object of the invention is to provide a camera which can employ films of different spectral sensitivity and wherein such films can be employed in daylight or artificial light.

An additional object of the invention is to provide a camera wherein the means which displaces one or more filters can be automatically adjusted as a function of spectral sensitivity of inserted film.

A further object of the invention is to provide a camera wherein the means for displacing one or more filters need not include a moving-coil measuring instrument.

The invention is embodied in a photographic apparatus, for example, in a motion picture camera, which comprises objective means positioned to admit scene light to photographic film, filter means movable between a plurality of positions to thereby influence the characteristics of scene light which is admitted by the objective means, and displacing means for moving the filter means between its positions in dependency on spectral composition of scene light. The displacing means comprises switching means (e.g., a relay or one or more transistors) having a plurality of conditions, photosensitive receiver means (preferably including two photosensitive resistors one of which reacts to daylight and the other of which reacts to artificial light) in circuit with the switching means and exposed or exposable to scene light to thereby change the condition of the switching means as a function of changes in spectral composition of scene light, and adjusting means (preferably including one or more electromagnets) for effecting movements of filter means in response to changes in condition of the switching means. The filter means may include one or more discrete filters movable into and from the path of scene light which is admitted by the objective means.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2a, illustrates a portion of a photographic apparatus which embodies the displacing circuit of FIG. 1, the filters being shown in positions they assume when the apparatus is loaded with artificial light film and is to be used in daylight;

FIG. 2b shows some of the structure of FIG. 2a but with the filters in positions they assume when the apparatus is loaded with daylight film and is to be used in daylight;

FIG. 2c shows the structure of FIG. 2b but with the filters in positions they assume when the apparatus is loaded with daylight film and is to be used in artificial light;

FIG. 2d shows the structure of FIG. 2b or 2c but with the filters in positions they assume when the apparatus is loaded with artificial light film and is to be used in artificial light;

DESCRIPTION OF THE PREFERRED EMBODIMENTS

Figure 1:
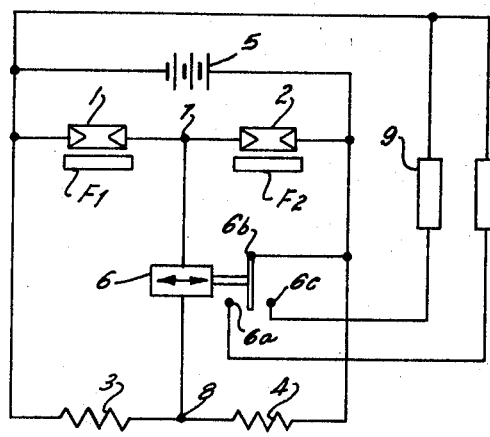
FIG. 1 is a diagram of an electric filter displacing circuit which embodies one form of our invention.

FIG. 1 shows an electric displacing circuit which is a bridge circuit and comprises two series-connected photosensitive resistors 1, 2 and two series-connected fixed resistors 3, 4. The resistors 1, 2 and 3, 4 are respectively in series with an energy source 5, e.g., a battery. When the resistors 1, 2 are completely shielded from light, their resistance respectively equals the resistance of fixed resistors 3, 4. The switching means of the circuit comprises a polarized relay 6. The positioning of the photosensitive resistors 1, 2 behind two corrective filters $F_1$ and $F_2$ is such that the resistor 1 reacts to (i.e., its resistance decreases in) daylight and that the resistance of the resistor 2 decreases in artificial light. The bridge circuit is balanced when the resistors 1, 2 are fully shielded from light and the switching relay 6 is deenergized so that its switch member 6b assumes the neutral position shown in FIG. 1. If the camera which embodies the circuit of FIG. 1 is used in artificial light which impinges on the photosensitive resistor 2, the potential of a tap 7 increases with reference to the tap 8, i.e., a current flows from the tap 7 toward the tap 8 and the switch member 6b of the thus energized switching relay 6 moves into engagement with a fixed contact 6a. When the photosensitive resistor 1 is exposed to a daylight, the potential of the tap 7 decreases with reference to the tap 8 whereby a current flows through the diagonal branch of the displacing circuit in a direction from the tap 8 toward the tap 7 so that the energized switching relay 6 moves its switch member 6b into engagement with a second fixed contact 6c. The contacts 6a, 6c respectively connect adjusting electromagnets 10, 9 in parallel with the energy source 5 when such contacts are engaged by the movable switch member 6b.

FIG. 2 shows a disk- or cup-shaped holder 11 which is turnable by a motion-transmitting device 32 between two end positions in response to insertion of film into the chamber 34 of the camera body or housing 33. When the chamber 34 receives a magazine or cartridge 35 containing daylight film, the device 32 automatically moves the holder 11 to the position 12; this holder is caused by device 32 to assume the position 13 in response to insertion of a cartridge containing artificial-light film. A filter means including a filter-carrying sector-shaped support 14 is mounted for angular movement about the axis of the holder 11 and is provided with three discrete corrective filters each of which can be moved into registry with the optical axis of the camera, i.e., in front of the film window or gate and behind an objective lens 30. The upper filter 15 is a red filter, the lower filter 16 is a blue filter, and the central filter 17 is simply an opening which is free to admit all of the scene light. The support 14 further comprises a radially extending arm or armature 18 which is located between the adjusting electromagnets 9 and 10. These electromagnets are mounted on the holder 11 in such a way that each thereof can attract the arm 18 in response to engagement of the switch member 6b with the corresponding fixed contact 6c or 6a of the switching relay 6. If the photosensitive resistor 1 is exposed to daylight and the camera contains artificial-light film, the relay 6 moves the switch member 6b into engagement with the contact 6c and thereby connects the adjusting electromagnet 9 with the energy source 5. The electromagnet 9 is energized and attracts the arm 18. This is shown in FIG. 2a which illustrates the holder 11 in the position 13 (the camera is loaded with artificial-light film). The red filter 15 is then located in registry with the optical axis of the objective lens 30. If the camera contains daylight film so that the holder 11 assumes the position 12 (FIG. 2b), the energized adjusting electromagnet 9 causes the support 14 to assume a position in which the filter 17 registers with the optical axis of the lens 30.

When the camera is used in artificial light, the resistance of the photosensitive resistor 2 decreases so that the switch member 6b of the switching relay 6 engages the contact 6a to connect the adjusting electromagnet 10 with the energy source 5. The thus energized electromagnet 10 attracts the arm 18 in a manner as shown in FIG. 2c or 2d. If the camera contains daylight film (FIG. 2c), the holder 11 and the support 14 assume such positions that the blue filter 16 moves into registry with the optical axis of the objective lens 30. The window 17 registers with the optical axis (FIG. 2d) if the camera contains artificial light film while the exposure is being made in artificial light.

FIG. 2a shows schematically the motion transmitting device 32 which is articulately connected to the holder 11 to move the latter from the position 12 to the position 13, or vice versa, depending upon whether the chamber 34 of the camera housing 33 accommodates a cartridge 35 which contains a first type of film or a different second type of film (e.g., daylight film or artificial light film). The cartridge 35 is provided with suitable coding means which is indicative of the sensitivity of film and can engage the device 32.

If desired, the holder 11 can be adjusted by hand to thereby select the initial position of the support 14 independently of the condition of the relay 6, i.e., to account for the type of film which is used in the camera.

Figure 3:
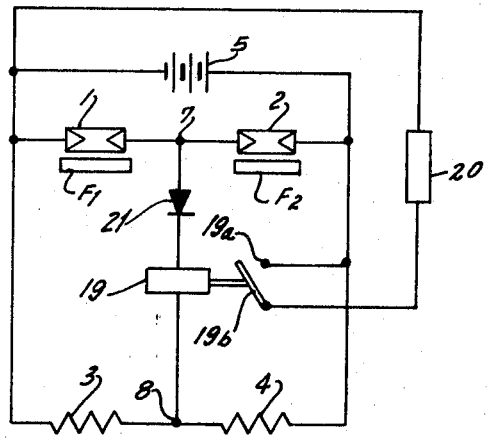
FIG. 3 is a diagram of a second filter displacing circuit which is designed for cameras utilizing a single type of film.

If the camera is designed to receive only one type of film i.e., film of a given spectral sensitivity), the displacing circuit of FIG. 1 is replaced with the bridge circuit of FIG. 3 which employs a non-polarized relay 19 serving as a switching means. The switch member 19b of the relay 19 is movable into or away from engagement with a contact 19a which can connect the energy source 5 in circuit with an adjusting electromagnet 20. The diagonal branch of the circuit further comprises a rectifier, here shown as a diode 21, whose anode is connected to the tap 7 and whose cathode is connected with the winding of the switching relay 19. It is assumed that the chamber in the housing of the camera which embodies the displacing circuit of FIG. 3 is designed to accept cartridges containing artificial light film.

When the photosensitive resistor 2 is exposed to artificial light, its resistance decreases so that the potential at the tap 7 rises. A current flows from the tap 7 toward the tap 8 to energize the switching relay 19 so that the switch member 19b engages the contact 19a and energizes the adjusting electromagnet 20 which moves a red filter (not shown) away from registry with the optical axis of the camera objective. If the resistor 1 is exposed to daylight, the potential of the tap 7 becomes negative relative to the tap 8 so that a current tends to flow from the tap 8 toward the tap 7; however, the flow is prevented by the rectifier 21 so that the switching relay 19 remains deenergized and prevents energization of the adjusting electromagnet 20. The red filter then remains in registry with the optical axis.

Figure 4:
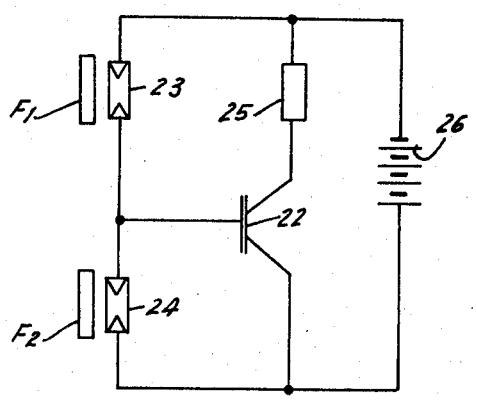
FIG. 4 is a diagram of an electronic displacing circuit which constitutes a modification of the circuit shown in FIG. 3.

Referring to FIG. 4, there is shown a third displacing circuit which comprises a switching means in the form of a transistor 22. The voltage divider for the base potential of the transistor 22 comprises two photosensitive resistors 23 and 24. The collector of the transistor 22 is connected with an adjusting electromagnet 25. The photosensitive resistors 23, 24 are mounted behind corrective filters $F_1$ and $F_2$ which insure that the resistance of the resistor 23 decreases in daylight and that the resistance of the resistor 24 decreases on exposure to artificial light. The circuit further comprises an energy source 26. It is assumed that the camera is designed for use with artificial light film. The resistances of the photosensitive resistors 23, 24 are selected in such a way that the switching transistor 22 blocks the flow of current when the resistors 23, 24 are shielded from light, i.e., that no current flows through the winding of the adjusting electromagnet 25. This electromagnet displaces a filter to move it to a position in which the filter extends across the path of light admitted by the objective when the camera is used in daylight, i.e., when the spectral composition of scene light does not match the spectral sensitivity of (artificial light) film. If the camera is designed for use with daylight film, the electromagnet 25 moves the filter to operative position when the camera is used in artificial light.

When the resistor 24 is exposed to artificial light, the base potential of the transistor 22 (which can be pnp transistor) becomes positive and the transistor continues to block the flow of current. If the resistor 23 is exposed to daylight, the base potential becomes negative, i.e., the signal voltage increases so that the transistor conducts current and the collector current effects energization of the electromagnet 25. The electromagnet 25 then causes the filter to move to a position in which the filter is in registry with the optical axis. The operation of the circuit shown in FIG. 4 is substantially the same if the photosensitive resistor 24 is replaced with a fixed resistor.

It is further clear that the camera which embodies the displacing circuit of FIG. 4 can include two built-in filters one of which is held in operative position when the spectral composition of scene light matches the spectral sensitivity of film and the other of which is moved to operative position by electromagnet 25 when the camera contains daylight film and is used in artificial light or vice versa. Still further, the camera which embodies the displacing circuit of FIG. 4 can utilize a single filter which is held in operative position when the spectral composition of scene light matches the spectral sensitivity of film but is moved away from the path of scene light admitted by the objective lens when the camera contains daylight film and is used in artificial light, or vice versa.

It is also within the purview of our invention to employ as the switching means of the displacing circuit a relay or an electromagnet with a switching member having two switching positions without automatic return movement to a given position, and a dividing system for each direction of action. Such dividing circuit consumes very little electrical energy because it reacts to short signals and thereupon fixes the switching member in its momentary position during the interval between two successive changes in spectral composition of scene light.

Figure 5:
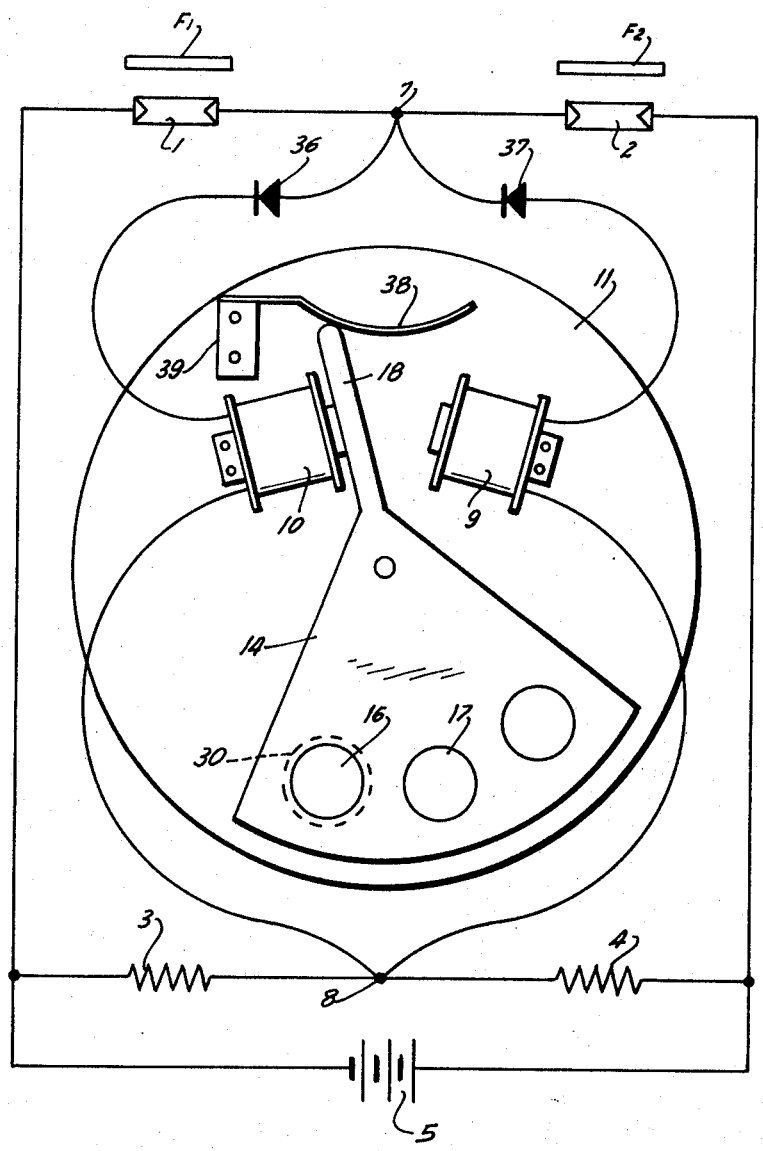
FIG. 5 is a diagrammatic view of a portion of a further photographic apparatus.

The just described modification is shown in FIG. 5 wherein the electromagnets 9, 10 constitute the switching means of the bridge circuit. Thus, the relay 6 of FIG. 1 can be dispensed with. When the photosensitive resistor 2 is exposed to artificial light, a current flows from the tap 7 between the photosensitive resistors 1, 2, through a diode 36, the electromagnet 10 and to the tap 8 between the fixed resistors 3, 4. A second diode 37 prevents the current from flowing through the electromagnet 9 in a direction from the tap 7 toward the tap 8. The electromagnet 10 is energized and attracts the armature 18 to thereby move the support 14 to a position in which the filter 16 registers with the objective lens 30 if the camera contains daylight film. A detent spring 38 which is secured to the holder 11 by means of a suitable fastener 39 automatically retains the armature 18 in the illustrated position when the electromagnet 10 is deenergized.

If the photosensitive resistor 1 is exposed to daylight, a current flows from the tap 8, through the electromagnet 9 and diode 37, and to the tap 7. The diode 36 prevents the flow of such current through the electromagnet 10. The energized electromagnet 9 attracts the armature 18 and moves the window 17 into registry with the objective lens 30 (it being assumed that the camera contains daylight film). The detent spring 38 thereupon maintains the armature in its right-hand end position even if the electromagnet 9 is deenergized. The electromagnets 9, 10 are strong enough to effect deformation of the detent spring 38 when one thereof is energized in response to exposure of resistor 1 to daylight or resistor 2 to artificial light.

As stated above, an advantage of the structure shown in FIG. 5 is that a short-lasting current impulse suffices to effect appropriate adjustment of the support 14. This is due to the provision of the detent spring 38 which automatically retains the armature 18 in position until the electromagnet 9 or 10 is energized again. The resulting savings in electrical energy are particularly important if the energy source 5 is a battery or a cell.

If desired, the filter or filters can be reciprocated to and from operative positions, preferably at right angles to the optical axis.

An important advantage of a camera which embodies the filter displacing means of our invention is that such displacing means occupies little room and that it can immediately react to replacement of film having a first spectral sensitivity with a film of a second spectral sensitivity or vice versa, as well as that it can immediately react to a change in spectral composition of scene light to move one or more corrective filters into or away from the path of scene light which is admitted by the objective lens. In this way, the spectral composition of light which is permitted to reach the film always matches the spectral sensitivity of film which is being used for a particular exposure or for a particular series of exposures.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims.

We claim:

1. In a photographic apparatus, a combination comprising objective means positioned to admit scene light to photographic film; filter means movable between plural positions to thereby influence the characteristics of scene light which is admitted by said objective means; displacing means for moving said filter means between said positions in dependency on spectral composition of scene light, said displacing means comprising electric switching means having a plurality of conditions, photosensitive receiver means in circuit with said switching means, said receiver means being exposed to scene light and being operative to change the condition of said switching means as a function of changes in spectral composition of scene light, said photosensitive receiver means including a first photosensitive resistor which reacts to daylight and a second photosensitive resistor which reacts to artificial light, said switching means comprising a first electromagnet energizable in response to exposure of said first resistor to daylight and a second electromagnet energizable in response to exposure of said second resistor to artificial light, and adjusting means for effecting movements of said filter means in response to changes in the condition of said switching means, said adjusting means including armature means which is movable to first and second positions on energization of said first and second electromagnets, respectively; and detent means for yieldably holding said armature means in either position.

2. In a photographic apparatus, a combination comprising a housing; color filter means movable in said housing between plural positions to thereby influence the characteristics of incoming scene light, said filter means including a daylight filter and an artificial light filter; displacing means for moving said filter means between said positions in dependency on the spectral composition of scene light, said displacing means comprising electric switching means having a plurality of conditions, photosensitive receiver means connected in circuit with said switching means, exposed to scene light and operative to change the condition of said switching means as a function of changes in spectral composition of scene light, said photosensitive receiver means comprising a pair of series-connected photosensitive resistors one of which reacts to daylight and the other of which reacts to artificial light, first and second fixed resistors connected in parallel with said photosensitive resistors and each having a resistance equaling the resistance of a different one of said photosensitive resistors when the respective photosensitive resistor is shielded from light, and adjusting means for effecting movements of said filter means in response to changes in the condition of said switching means, said adjusting means comprising first and second electromagnet means respectively energizable on exposure of said first and second photosensitive elements to daylight and artificial light, respectively; and holder means supporting said filter means and said electromagnets and movable between two positions to thereby select the initial position of said filter means in dependency on the type of film which is used in the apparatus, the initial position of said filter means in one position of said holder means being appropriate when the apparatus contains daylight film and the initial position of said filter means in the other position of said holder means being appropriate when the apparatus contains artificial light film.

3. A combination as defined in claim 2, further comprising means for moving said holder means between said positions thereof.

4. A combination as defined in claim 3, wherein said means for moving said holder means is actuatable in response to insertion of film-containing cartridges into said housing.

* * * * *